United States Patent
Stadermann et al.

(10) Patent No.: US 10,008,338 B2
(45) Date of Patent: Jun. 26, 2018

(54) HIGH TEMPERATURE OXYGEN TREATED CARBON AEROGELS

(71) Applicant: LAWRENCE LIVERMORE NATIONAL SECURITY, LLC, Livermore, CA (US)

(72) Inventors: Michael Stadermann, Pleasanton, CA (US); Theodore F. Baumann, Discovery Bay, CA (US); Alexander E. Gash, Brentwood, CA (US); Alex P. Parra, West Point, NY (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 168 days.

(21) Appl. No.: 14/994,854

(22) Filed: Jan. 13, 2016

(65) Prior Publication Data

US 2017/0200566 A1   Jul. 13, 2017

(51) Int. Cl.
| | |
|---|---|
| H01B 1/04 | (2006.01) |
| C01B 32/15 | (2017.01) |
| H01G 11/34 | (2013.01) |
| H01G 11/24 | (2013.01) |
| H01G 11/44 | (2013.01) |
| C02F 1/469 | (2006.01) |
| C02F 1/461 | (2006.01) |

(52) U.S. Cl.
CPC .............. *H01G 11/34* (2013.01); *H01G 11/24* (2013.01); *H01G 11/44* (2013.01); *C02F 1/4691* (2013.01); *C02F 2001/46133* (2013.01)

(58) Field of Classification Search
CPC ............ C04B 14/028; H01B 1/02; H01B 1/04
USPC .......................................... 252/500, 502, 506
See application file for complete search history.

(56) References Cited

U.S. PATENT DOCUMENTS

| | | |
|---|---|---|
| 5,789,338 A | 8/1998 | Kaschmitter et al. |
| 2006/0014908 A1 | 1/2006 | Rotermund et al. |

FOREIGN PATENT DOCUMENTS

WO   WO-2012/006973 A1   1/2012

OTHER PUBLICATIONS

Hwang (Capacitance control of carbon aerogel electrodes. Journal of Non-Crystalline Solids 347 (2004) 238-245).*
Saliger ("High surface area carbon aerogels for supercapacitors." Journal of Non-Crystalline Solids 225 1998. 81-85).*
Tao ("Hydrophilicity-Controlled Carbon Aerogels with High Mesoporosity." J. Am. Chem. Soc. 2009, 131, 904-905).*
Wang ("Tailoring of Pore Structures and Surface Properties of Syndiotactic Polystyrene Aerogels." Electronic Dissertation, Univ of Akron, Retrieved from https://etd.ohiolink.edu/). (Year: 2013).*
Baumann et al., "High surface area carbon aerogel monoliths with hierarchical porosity," Journal of Non-Crystalline Solids, vol. 354, 2008, pp. 3513-3515.
Kim et al., "Preparation of carbon aerogel electrodes for supercapacitor and their electrochemical characteristics," Journal of Materials Science, vol. 40, 2005, pp. 725-731.
Moreno et al., "Modification of the Chemistry Surface Characteristics of Carbon Aerogels by Oxidative Treatments," vol. 39, No. 2, 2010, pp. 257-267.

* cited by examiner

*Primary Examiner* — Tri V Nguyen
(74) *Attorney, Agent, or Firm* — Foley & Lardner, LLP

(57) ABSTRACT

Disclosed here is a method for increasing the hydrophilicity of a carbon aerogel, comprising heating the carbon aerogels under air or a gas having a higher concentration of oxygen than air at a temperature of about 200°-500° C. to obtain an activated carbon aerogel. Also disclosed include an activated carbon aerogel obtained by the method, an electrode comprising the activated carbon aerogel, and a supercapacitor or capacitive deionization device comprising the electrode.

14 Claims, No Drawings

HIGH TEMPERATURE OXYGEN TREATED CARBON AEROGELS

STATEMENT AS TO RIGHTS TO INVENTIONS MADE UNDER FEDERALLY SPONSORED RESEARCH AND DEVELOPMENT

The United States Government has rights in this invention pursuant to Contract No. DE-AC52-07NA27344 between the United States Department of Energy and Lawrence Livermore National Security, LLC for the operation of Lawrence Livermore National Laboratory.

BACKGROUND

Carbon aerogels are conducting materials with highly tunable properties. Pore sizes and density of the polymer aerogel can be controlled with the right choice of reactants, catalyst, and curing conditions. Often, it is desirable to further modify the aerogel after it has been carbonized to change the porosity or surface qualities further and tune the material to a specific application. For example, one field of use of carbon aerogels is as capacitive material in supercapacitors or capacitive deionization. For this application, it is desirable for the material to be hydrophilic, although carbon aerogels after pyrolysis are often hydrophobic. Previous post-treatment procedures usually involve a high-temperature etch with carbon dioxide. This etch increases hydrophilicity and porosity of the material, but requires high temperature (950° C.) and produces a toxic gas, carbon monoxide. A further drawback is that, under regular etching conditions, there is no natural stop of the reaction, and the reaction time has to be controlled closely. These drawbacks increase the difficulty and cost of desirable post-processing.

Therefore, a need exists for an improved method for increasing hydrophilicity and porosity of carbon aerogels that is easier to implement and more cost-effective and environmentally friendly than established post-treatment methods.

SUMMARY

Disclosed here is a method of chemically modifying carbon aerogels after carbonization using elevated temperatures and oxygen or air. The treatment is adapted to increase the hydrophilicity and porosity of carbon aerogels.

Therefore, one aspect of some embodiments of the invention described herein relates to a method for increasing the hydrophilicity of a carbon aerogel, comprising heating the carbon aerogels under air or a gas having a higher concentration of oxygen than air at a temperature of about 200°-500° C. to obtain an activated carbon aerogel.

Another aspect of some embodiments of the invention described herein relates to a method for making an activated carbon aerogel, comprising: providing a reaction mixture comprising resorcinol, formaldehyde, and at least one catalyst; curing said reaction mixture to form a wet gel; drying said wet gel to produce a dry gel; pyrolyzing said dry gel to produce a carbon aerogel; and heating the carbon aerogels under air or a gas having a higher concentration of oxygen than air at a temperature of about 200°-500° C. to obtain an activated carbon aerogel.

A further aspect of some embodiments of the invention described herein relates to an activated carbon aerogel, wherein the activated carbon aerogel has a wetting angle of about 5° or less, an atomic oxygen content of about 5-30 at. % on its surface, and/or a capacity of at least about 100 F/g or at least about 50 $F/cm^3$.

An additional aspect of some embodiments of the invention described herein relates to an electrode comprising the activated carbon aerogel, and also a supercapacitor or capacitive deionization device comprising the electrode.

These and other features, together with the organization and manner of operation thereof, will become apparent from the following detailed description.

DETAILED DESCRIPTION

Reference will now be made in detail to some specific embodiments of the invention contemplated by the inventors for carrying out the invention. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise.

Methods for Increasing Hydrophilicity of Carbon Aerogels

The invention overcomes the shortcomings of prior art post-treatment of carbon aerogels under carbon dioxide, by utilizing a different gas for the activation—oxygen, either pure or mixed with inert gas such as nitrogen. Using oxygen instead of carbon dioxide reduces the etch temperature to about 350°-500° C., depending on the desired etch results, and releases no toxic gases. The reaction produces carbon dioxide rather than carbon monoxide.

Oxygen treatment of carbon aerogels can be performed by heating up the carbon aerogel material in an oxygen-containing atmosphere. In some embodiments, air is used due to reduced cost and hazard level. Higher concentrations of oxygen can be used as well, which would result in different process temperatures.

In some embodiments, a gentle oxidation can be achieved by heating the aerogel in air to about 350° C. At this temperature, a mild oxidation occurs, sufficient to substantially increase the wettability of the material, which makes it useful for application as electrode material in aqueous solutions and facilitates loading the material with solutions for functionalizing the material. Overall mass loss can be low. As the reaction is typically self-limiting, mass transport in the reactor is not an issue in general, although treatment time can be extended for geometries with poor mass transport.

At higher temperatures, a more significant amount of mass can be removed. For temperatures up to about 500° C., the reaction can terminate by itself, and the leftover mass can be determined by the reaction temperature. Above 500° C., the carbon can be etched away completely if the reaction is not interrupted. It is believed that the more reactive carbons are etched out first, leaving behind the more stable carbons. The final products can be more corrosion-stable for electrochemical applications.

The material removal can also widen the pore sizes to facilitate mass transport through the material, which is useful for applications such as flow-through electrode capacitive desalination (FTE-CD). The capacity of aerogels etched at 490 and 500° C. was measured in 2M NaCl and found to be about 120-150 F/g or about 60 F/cm$^3$, which is suitable for FTE-CD application. It is believed that lower activation levels can retain a higher volumetric capacitance.

Accordingly, many embodiments described herein relate to a method for increasing the hydrophilicity of a carbon aerogel, comprising heating the carbon aerogels under air or a gas having a higher concentration of oxygen than air at a temperature of about 200°-500° C. to obtain an activated carbon aerogel.

In some embodiments, the carbon aerogel is heated under air. In some embodiments, the carbon aerogel is heated under oxygen. In some embodiments, the carbon aerogel is heated under a gas comprising at least about 10%, at least about 20%, or at least about 40%, or at least about 60%, or least about 80%, or at least about 90%, or at least about 95%, or at least about 99% of oxygen. In some embodiments, the carbon aerogel is heated under a mixture of oxygen and an inert gas such as nitrogen (e.g., about 20% oxygen and about 80% nitrogen). Lower activation temperatures or shorter activation times are typically applied when larger oxygen fractions are present in the activation environment.

In some embodiments, the carbon aerogel is heated at a temperature of about 350°-450° C. In some embodiments, the carbon aerogel is heated at a temperature of about 380-450° C. In some embodiments, the carbon aerogel is heated at a temperature of about 200°-300° C., or about 300°-350° C., or about 350°-400° C., or about 400°-450° C., or about 450°-500° C. Longer activation times are typically used at lower activation temperatures.

In some embodiments, the carbon aerogel is heated for about 30-300 minutes. In some embodiments, the carbon aerogel is heated for about 30-180 minutes. In some embodiments, the carbon aerogel is heated for about 30-60 minutes, or about 60-120 minutes, or about 120-180 minutes, or about 180-240 minutes, or about 240-300 minutes.

In some embodiments, the carbon aerogel is heated in a chamber under flowing gas having a flow rate of about 0-5 sccm/cm$^2$, or about 0 sccm/cm$^2$, or about 0-1 sccm/cm$^2$, or about 1-2 sccm/cm$^2$, or about 2-3 sccm/cm$^2$, or about 3-4 sccm/cm$^2$, or about 4-5 sccm/cm$^2$, of the chamber's cross sectional area. In some embodiments, the carbon aerogel is heated in a tube under flowing gas having a flow rate of about 0-5 sccm/cm$^2$, or about 0 sccm/cm$^2$ (e.g., open tube ends, diffusion transport), or about 0-1 sccm/cm$^2$, or about 1-2 sccm/cm$^2$, or about 2-3 sccm/cm$^2$, or about 3-4 sccm/cm$^2$, or about 4-5 sccm/cm$^2$ of the tube's cross sectional area.

In some embodiments, the unactivated carbon aerogel is obtained by: (a) providing a reaction mixture comprising at least one reactant and at least one catalyst; (b) curing said reaction mixture to form a wet gel; (c) drying said wet gel to produce a dry gel; and (d) pyrolyzing said dry gel to produce the carbon aerogel. Exemplary methods for producing the unactivated carbon aerogel is described in Baumann et al., *J. Non-Crystalline Solids*, 354:3513-3515 (2008), which is incorporated herein by reference in its entirety.

In some embodiments, the wet gel is formed by the sol-gel polymerization of resorcinol with formaldehyde in an aqueous solution. In some embodiments, the reaction mixture consists essentially of or consists of resorcinol, formaldehyde, at least one catalyst, and at least one solvent.

Other than resorcinol and formaldehyde, the reactants can also include, for example, resorcinol-furfural, phloroglucinol-formaldehyde, phenol-formaldehyde, cresol-formaldehyde, or phenol-furfuryl alcohol.

In some embodiments, the reaction mixture comprises at least one catalyst. In some embodiments, the catalyst is an acid catalyst. In some embodiments, the catalyst is a base catalyst. In some embodiments, the catalyst is acetic acid. Other suitable catalysts include, but are not limited to, nitric acid, ascorbic acid, hydrochloric acid, sulfuric acid, sodium carbonate, sodium hydroxide, ammonium hydroxide, and calcium sulfate. The reactant-to-catalyst ratio may range from about 10 to greater than about 1000.

In some embodiments, the reaction mixture is cured at a temperature of about 25-100° C. to produce a wet gel. In some embodiments, the reaction mixture is cured for about 12-72 hours at a temperature of about 80-85° C. In some embodiments, the reaction mixture is cured at atmospheric pressure.

In some embodiments, the wet gel is subjected to solvent exchange to remove reaction by-products. Suitable solvent include, but are not limited to, DI water. In some embodiments, the wet gel is subjected to solvent exchange to remove water. Suitable solvents include, but are not limited to, acetone.

In some embodiments, the wet gel is dried under supercritical condition (e.g., using supercritical $CO_2$). In some embodiments, the wet gel is dried under ambient temperature and pressure. In some embodiments, the wet gel is freeze dried.

In some embodiments, the dry gel is initially thermally annealed in an inert gas (e.g., nitrogen) at a temperature of at least about 600° C., or at least about 800° C., or at least about 1000° C., or at about 1050° C., to produce the unactivated carbon aerogel.

Activated Carbon Aerogel

The activated carbon aerogel described herein can be increased hydrophilicity compared to a corresponding unactivated carbon aerogel. In some embodiments, the activated carbon aerogel has a wetting angle of about 20° or less, or about 10° or less, or about 5° or less, or about 3° or less, or about 2° or less, or about 1° or less, or about 0°. In some embodiments, the activated carbon aerogel has a wetting angle that is decreased by at least about 15°, or at least about 20°, or at least about 25°, or at least about 30°, or at least about 35°, or at least about 40°, or at least about 45°, compared to a corresponding unactivated carbon aerogel.

The activated carbon aerogel described herein can have increased porosity compared to a corresponding unactivated carbon aerogel. In some embodiments, the activated carbon aerogel has a total pore volume of at least about 0.2 cm$^3$/g, or at least about 0.3 cm$^3$/g, or at least about 0.5 cm$^3$/g, or at least about 0.7 cm$^3$/g, or at least about 0.9 cm$^3$/g, or at least about 1 cm$^3$/g. In some embodiments, the activated carbon aerogel has a total pore volume that is increased by at least about 20%, or at least about 50%, or at least about 100%, or at least about 200%, or at least about 300%, or at least about 500%, compared to a corresponding unactivated carbon aerogel.

In some embodiments, the activated carbon aerogel has a BET surface area of at least about 500 m$^2$/g, or at least about 700 m$^2$/g, or at least about 1000 m$^2$/g, or at least about 1200 m$^2$/g, or at least about 1500 m$^2$/g, or at least about 2000 m$^2$/g. In some embodiments, the activated carbon aerogel has a BET surface area that is increased by at least about 20%, or at least about 50%, or at least about 100%, or at least about 200%, or at least about 300%, or at least about 500%, compared to a corresponding unactivated carbon aerogel.

In some embodiment, the activated carbon aerogel contains pores such as macropores, micropores, and mesopores, as well as combinations thereof. Macropores can be generally defined as pores of a diameter or width of more than 50 nm. Micropores can be generally defined as pores of a diameter or width of less than 2 nm. Mesopores can be generally defined as pores of a diameter or width of 2-50 nm.

The activated carbon aerogel can comprise a plurality of macropores throughout its thickness. In one embodiment, the average diameter of the macropores inside the activated carbon aerogel is 100 nm or more, or 200 nm or more, or 500 nm or more, or 1 micron or more. In a further embodiment, the macropores form a continuous network inside the activated carbon aerogel, allowing the precursor gas of a nanomaterial to be able to diffuse uniformly throughout the thickness of the activated carbon aerogel.

In addition to macropores, the activated carbon aerogel may also comprise micropores and/or mesopores throughout its thickness. In one embodiment, the average diameter of the combined micropores and/or mesopores (or pores) is 10 nm or less, or 5 nm or less, or 2 nm or less.

In some embodiment, the activated carbon aerogel has a bimodal porosity (macro- and micropores). For example, the activated carbon aerogel can have a first set of pores of an average diameter of 1 micron or more and a second set of pores of an average diameter of 10 nm or less. Larger pores can provide access to the whole material and help avoid clogging of the external surfaces. Smaller pores can increase the internal surface area. In one embodiment, the activated carbon aerogel is not dominated by mesopores. In one embodiment, micropores and macropores are the predominant pore structure.

The activated carbon aerogel described herein can have a higher atomic oxygen content compared to a corresponding carbon aerogel activated under $CO^2$. In some embodiments, the activated carbon aerogel has an atomic oxygen content on its surface of at least about 5 at. %, or at least about 10 at. %, or at least about 15 at. %, or at least about 20 at. %, or about 5-30 at. %, or about 10-25 at. %, or about 15-20 at. %. In some embodiments, the activated carbon aerogel has an atomic oxygen content on its surface that is at least about 5 at. % more, or at least about 10 at. % more, or at least about 15 at. % more, or at least about 20 at. % more, than a corresponding carbon aerogel activated under $CO^2$.

The activated carbon aerogel described herein can have increased capacity compared to a corresponding unactivated carbon aerogel. In some embodiments, the activated carbon aerogel has a capacity of at least about 60 F/g, or at least about 80 F/g, or at least about 100 F/g, or at least about 120 F/g, or about 100-180 F/g, or about 120-150 F/g. In some embodiments, the activated carbon aerogel has a capacity of at least about 40 $F/cm^3$, or at least about 50 $F/cm^3$, or at least about 60 $F/cm^3$, or about 40-80 $F/cm^3$, or about 50-70 $F/cm^3$.

The activated carbon aerogel described herein can have decreased weight compared to a corresponding unactivated carbon aerogel. In some embodiments, the activated carbon aerogel has a weight loss of about 70 wt. % of less, or about 50 wt. % of less, or about 30 wt. % of less, or about 20 wt. % of less, or about 10 wt. % of less, or about 5 wt. % of less, compared to a corresponding unactivated carbon aerogel.

Applications and Derivatives of Activated Carbon Aerogel

The activated carbon aerogels described herein can be used in a variety of applications. For example, they can be used as electrode materials in supercapacitors, energy storage devices, and capacitive deionization devices.

The ability to easily infiltrate the material with solutions also makes the activated carbon aerogel a desirable base material for making derivative composites, such as metal or metal-oxide doped aerogels or energetic materials. Accordingly, an additional aspect of the invention described herein relates to a composite derived from the activated carbon aerogel.

The composite can comprise, for example, a metal or a metal compound deposited or disposed onto the internal surfaces of the activated carbon aerogel. The metal or metal compound can be deposited or disposed throughout the entire thickness of the activated carbon aerogel. In some embodiments, the composite comprises a metal nanoparticle deposited or disposed onto the internal surfaces of the activated carbon aerogel. In some embodiments, the composite comprises a metal oxide deposited or disposed onto the internal surfaces of the activated carbon aerogel. In some embodiments, the composite comprises a metal chalcogenide (e.g., a metal sulfide) deposited or disposed onto the internal surfaces of the activated carbon aerogel. In some embodiments, the composite comprises a metal nitride deposited or disposed onto the internal surfaces of the activated carbon aerogel. In some embodiments, the composite comprises a metal carbide deposited or disposed onto the internal surfaces of the activated carbon aerogel. In some embodiments, the composite comprises a metal carbonitride deposited or disposed onto the internal surfaces of the activated carbon aerogel. Methods for depositing the metal or metal compound can be found in U.S. Pat. No. 8,664,143, US Pat. Pub. No. 2014/0121425, US Pat. Pub. No. 2014/0178759, and U.S. patent application Ser. No. 14/485,474, each of which is incorporated herein by reference.

The composite can comprise, for example, a silicon or boron compound deposited or disposed onto the internal surfaces of the activated carbon aerogel. The silicon or boron compound can be deposited or disposed throughout the entire thickness of the activated carbon aerogel. In some embodiments, the composite comprises a silicon compound (e.g., silicon oxide, silicon carbide, silicon nitride) deposited or disposed onto the internal surfaces of the activated carbon aerogel. In some embodiments, the composite comprises a boron compound (e.g., boron nitride) deposited or disposed onto the internal surfaces of the activated carbon aerogel. Methods for depositing or deriving the silicon or boron compound can be found in U.S. Pat. No. 8,629,076 and US. Pat. Pub. No. 2015/0004087, each of which is incorporated herein by reference.

The composite can comprise, for example, a polymer deposited or disposed onto the internal surfaces of the activated carbon aerogel. The polymer can be deposited or disposed throughout the entire thickness of the activated carbon aerogel. In some embodiments, the composite comprises polydimethylsiloxane or epoxy deposited or disposed onto the internal surfaces of the activated carbon aerogel. Methods for depositing the polymer can be found in U.S. Pat. No. 9,087,625, which is incorporated herein by reference.

As used herein, the singular terms "a," "an," and "the" include plural referents unless the context clearly dictates otherwise. Thus, for example, reference to a compound can include multiple compounds unless the context clearly dictates otherwise.

As used herein, the terms "substantially," "substantial," and "about" are used to describe and account for small variations. When used in conjunction with an event or circumstance, the terms can refer to instances in which the event or circumstance occurs precisely as well as instances in which the event or circumstance occurs to a close approximation. For example, the terms can refer to less than or equal to ±10%, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

Additionally, amounts, ratios, and other numerical values are sometimes presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

In the foregoing description, it will be readily apparent to one skilled in the art that varying substitutions and modifications may be made to the invention disclosed herein without departing from the scope and spirit of the invention. The invention illustratively described herein suitably may be practiced in the absence of any element or elements, limitation or limitations, which is not specifically disclosed herein. The terms and expressions which have been employed are used as terms of description and not of limitation, and there is no intention that in the use of such terms and expressions of excluding any equivalents of the features shown and described or portions thereof, but it is recognized that various modifications are possible within the scope of the invention. Thus, it should be understood that although the present invention has been illustrated by specific embodiments and optional features, modification and/or variation of the concepts herein disclosed may be resorted to by those skilled in the art, and that such modifications and variations are considered to be within the scopes of this invention.

What is claimed is:

1. A method for increasing the hydrophilicity of a carbon aerogel, comprising heating the carbon aerogels under air or a gas having a higher concentration of oxygen than air at a temperature of about 200°-500° C. to obtain an activated carbon aerogel, wherein the carbon aerogel is heated in a chamber under flowing gas having a flow rate of about 5 sccm/cm$^2$ or less of the chamber's cross sectional area, and wherein the activated carbon aerogel has a wetting angle of about 1° or less.

2. The method of claim 1, wherein the carbon aerogel is heated under air.

3. The method of claim 1, wherein the carbon aerogel is heated at a temperature of about 350-450° C.

4. The method of claim 1, wherein the carbon aerogel is heated for about 30-300 minutes.

5. The method of claim 1, wherein the carbon aerogel is obtained by:
   providing a reaction mixture comprising resorcinol, formaldehyde, and at least one catalyst,
   curing said reaction mixture to form a wet gel,
   drying said wet gel to produce a dry gel, and
   pyrolyzing said dry gel to produce the carbon aerogel.

6. The method of claim 1, wherein the activated carbon aerogel has a wetting angle that is decreased by at least about 30° compared to a corresponding unactivated carbon aerogel.

7. The method of claim 1, wherein the activated carbon aerogel has a wetting angle that is decreased by at least about 45° compared to a corresponding unactivated carbon aerogel.

8. The method of claim 1, wherein the activated carbon aerogel has an atomic oxygen content of about 5-30 at. % on its surface.

9. The method of claim 1, wherein the activated carbon aerogel has an atomic oxygen content of about 10-25 at. % on its surface.

10. The method of claim 1, wherein the activated carbon aerogel has an atomic oxygen content on its surface that is at least about 10 at. % more than a corresponding carbon aerogel activated under $CO^2$.

11. The method of claim 1, wherein the activated carbon aerogel has an atomic oxygen content on its surface that is at least about 15 at. % more than a corresponding carbon aerogel activated under $CO^2$.

12. The method of claim 1, wherein the activated carbon aerogel has a capacity of at least about 100 F/g or at least about 50 F/cm$^3$.

13. The method of claim 1, wherein the activated carbon aerogel has a capacity of about 120-150 F/g or about 50-70 F/cm$^3$.

14. The method of claim 1, wherein the activated carbon aerogel has a weight loss of about 50 wt. % of less compared to a corresponding unactivated carbon aerogel.

* * * * *